Fig. 1.

United States Patent Office 3,320,586
Patented May 16, 1967

3,320,586
MOTOR VEHICLE CONTROL LIGHT SYSTEM
Tobias Wagner, Bronx, N.Y., assignor of fifty percent to Mary T. Hanner, Bronx, N.Y.
Filed Nov. 19, 1964, Ser. No. 412,560
16 Claims. (Cl. 340—66)

This invention relates to the art of visual signaling systems for vehicles and more particularly concerns illuminated signal apparatus for a vehicle, the apparatus indicating operating speed, acceleration, deceleration, braking and stopping conditions.

The apparatus further includes alarm means for indicating a dangerous road, traffic or driving condition, mechanical difficulties, or physical discomfort or disability experienced by the driver of the vehicle.

The need has long existed for more meaningful means of communication between the driver or operator of a vehicle and drivers or operators of other vehicles in the vicinity. When approaching another vehicle from behind, it is necessary that the driver of a following vehicle should be able to determine instantly the intentions of the driver ahead and the operating condition of his vehicle. It is desirable that the following driver know if the leading driver is:

(1) Experiencing mechanical difficulties.
(2) Encountering a dangerous road or traffic condition.
(3) Making a sudden stop.
(4) Slowing down without intending to stop.
(5) Accelerating.
(6) Maintaining proper and regular speed.
(7) Experiencing physical discomfort or disability.

It is further desirable that signaling apparatus in a vehicle should provide instantly visible, attention attracting signals to the other drivers of vehicles.

According to the invention, there is provided apparatus including a main signaling device which may be mounted at the rear of a vehicle, on top of the vehicle, or at some other position where it will be most conspicuous and readily seen by other drivers. The device will preferably include a large red danger signal and a housing with three horizontal rows, bands or areas emitting colored signal lights. In each row are lamps emitting light of different colors, or the lamps may emit white light and transparent, colored lenses may be placed in front of the lamps in the row. The uppermost colored row emits red light. The next lower row emits amber, yellow or orange light. The lowermost row emits green light.

The large danger signal light will flash a bright red light whenever the driver of the vehicle blows the horn of his vehicle or actuates an operating switch. The front and rear directional signals of the vehicle and the upper row of red lights in the apparatus can be arranged in the circuit of the apparatus so that the directional signals and upper row of red lights flash when the horn is blown or a manually operable switch is operated. A further switch may be provided to turn off the horn while the danger signals continue flashing. The uppermost row of red lights are also operatively connected to the braking system of the vehicle. Whenever the brakes are actuated, the red lights go on.

The next lower row of amber, yellow or orange lights indicates caution is required. These lamps will be connected to the throttle, accelerator pedal, speedometer, engine or transmission and will light only when the vehicle slows down or decelerates.

The lowermost row of lamps emit green light. The green lights may be connected to light progressively at different speeds. As speed increases, more lamps will light.

At maximum speed all lamps in the row will light.

These lamps can be connected to the speedometer, accelerator, engine or transmission of the vehicle. They indicate to other drivers the actual speed of the vehicle at all times. The green lights may also be connected so that all the lamps in the green row light up simultaneously at all speeds to indicate that the vehicle is moving. These green lights may also be arranged so that they all flash when the vehicle is accelerated. The green lights will then provide no external indication of actual speed of the vehicle, but will provide drivers of following vehicles with information as to vehicle movement and acceleration.

A monitoring device is included in the apparatus. This device is preferably installed on the dashboard or at the driver's position of the vehicle. This device has rows of lamps which light when corresponding lamps light on the main external signaling device. The monitoring device serves to keep the driver of the vehicle alert, and informed of the operating condition of the main signal device. Operating switches may be located on the dashboard of the vehicle.

The monitoring device will indicate to the driver the speed of the vehicle since the green row can be marked with numerical calibrations from 0 to 100 representing miles per hour, in steps of five or ten, for example:

0, 10, 20, 30, 40, 50, 60, 70, 80, 90, 100. The lamps in the green row can be connected so that a green light goes on as speed is increased and the green light goes off as speed is decreased.

For example if the vehicle travels 50 miles per hour, the green light at calibration "50" will be on. The green light at calibration "60" will go on when the speed is raised to sixty miles per hour. The green light at calibration "50" can be arranged to stay lighted or go out when the speed is raised to sixty miles per hour. If the speed is reduced to thirty miles per hour, the green light at calibration "30" will go on, and the green lights in calibrations "40", "50" and "60" will go off. The amber light at each speed will light as the speed is reduced to or past that speed. The amber lights can be arranged so that all amber lights go on when the vehicle is decelerated at all speeds. The main signaling device at the rear of the vehicle can also be provided with numerical speed calibrations if desired.

The invention is applicable to vehicles of all types including land, air and water vehicles. The apparatus can be installed in automobiles, trucks, buses, trains and other land vehicles. It can be used on airplanes and boats of all types and sizes, wherever there are adjacent drivers or operators to be informed of the operating condition of the vehicle in which the apparatus is installed.

It is therefore one object of the invention to provide signaling apparatus for a vehicle, the apparatus including a main signaling device and a monitoring signaling device, the devices being connected in parallel and including flashing danger signals, red signals indicating braking of the vehicle, amber signals indicating deceleration, and green signals indicating operating speed or simply indicating that the vehicle is accelerating or moving.

A further object is to provide a signaling apparatus as described wherein the main and monitoring device both include housings or casings having rows of red, amber and green signal lights operatively connecting different operating equipment of the vehicle.

Still another object is to provide apparatus as described, wherein a flashing red light is operatively connected to an audible alarm or horn or to an operating switch which can also be connected to the front and rear directional signals of the vehicle and to the rear red rows of lights in the main and monitoring devices so that the direction lights and red rows of lights flash to indicate danger; the red row of lights in each device being also connected to the braking system of the vehicle to indicate braking or stopping; the amber and green rows of lights in each device being connected to the throttle, transmission, speedometer or engine of the vehicle to indicate movement, acceleration and deceleration.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure.

Figure 1:
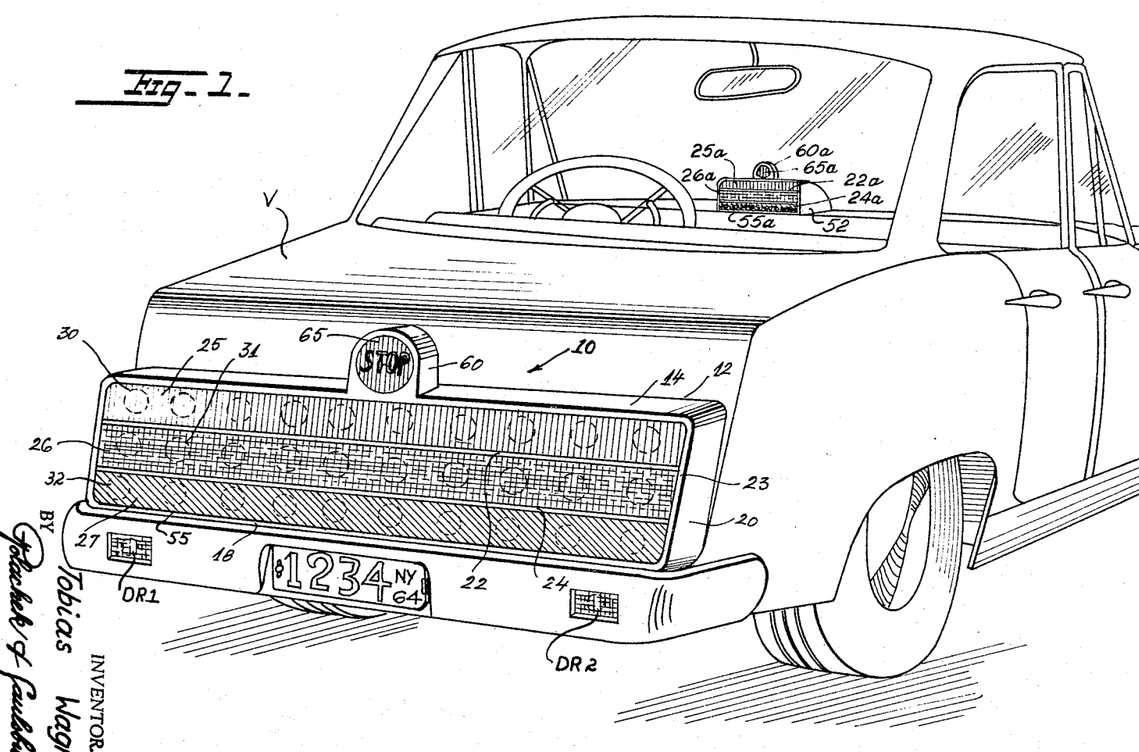
FIGURE 1 is a perspective view of a vehicle employing the signal devices of the present invention.
Figure 2:
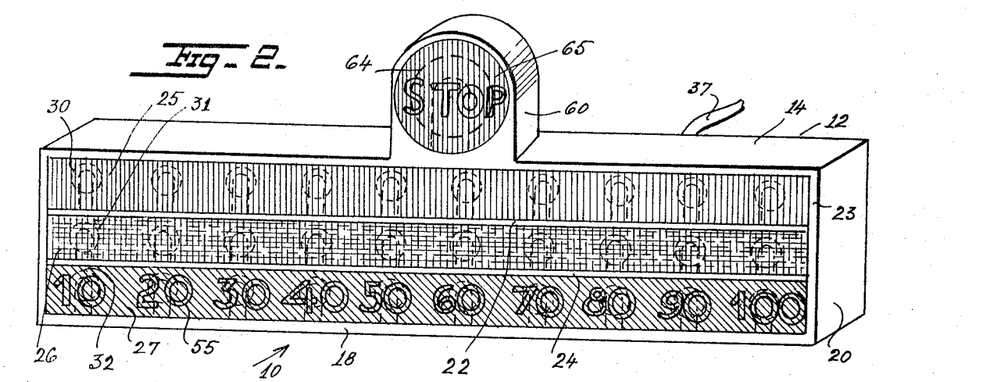
FIG. 2 is an oblique front view of a main signaling device employed in the apparatus embodying the invention.
Figure 3:
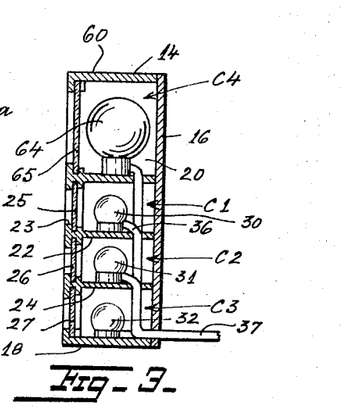
FIG. 3 is a sectional view taken on line 3—3 of FIG. 2.

Referring first to FIGS. 1–3, there is shown the main signaling device 10 of the apparatus. This device includes a rectangular casing or housing 12 which has a top wall 14, rear panel or wall 16, bottom wall 18, end walls 20 and an open front. Two horizontal, parallel partitions 22, 24 are provided in the housing dividing it into three long compartments C1, C2 and C3 extending the full length of the interior of the housing. In frames 23 of the open fronts of the compartments are installed transparent colored plates, windows or lenses 25, 26, 27. Lens 25 is red; lens 26 is amber; lens 27 is green.

Behind the lenses are rows of lamps 30, 31, 32 in the respective compartments C1–C3 extending for the full length of the interior of the housing. Any suitable means may be provided for mounting the device at the rear 35 of a vehicle V. This vehicle may be an automobile, truck, bus, train or other land vehicle, or it may be an aircraft or watercraft. All the lamps are connected by wires 36 to a cable 37 which passes out through the rear wall 16. The wires in the cable are connected to parts of the vehicle as described in further detail below in connection with FIG. 7. Device 10 may extend substantially the full width of vehicle V.

Figure 4:
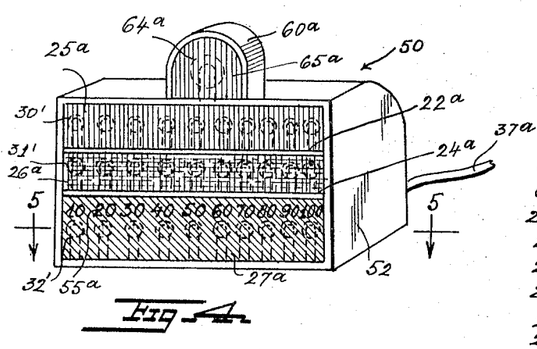
FIG. 4 is an oblique front view of a monitoring device employed in the apparatus.
Figure 5:
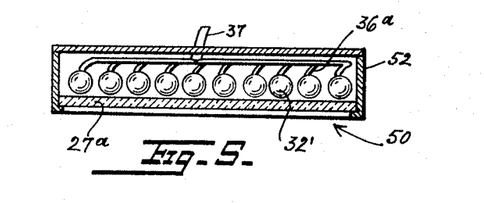
FIG. 5 is a sectional view taken on line 5—5 of FIG. 4.

The monitoring device 50 of the apparatus shown in FIGS. 1, 4, 5, 6 is somewhat smaller than device 10. The device 50 includes a rectangular housing 52 which can be installed at the dashboard 54 of the vehicle V or at any other appropriate location at the driver's or operator's position. In housing 52 are three rows of lamps 30', 31' and 32' behind red, amber and green lenses 25a, 26a, 27a in compartments defined by partitions 22a, 24a corresponding to those of device 10. On the lenses 27 and 27a of devices 10 and 50 may be provided clear or colored areas 55, 55a defining numbers ranging from "10" to "100" by tens as shown in FIGS. 2 and 4. These numbers indicate vehicle speeds. Other numbers may be used if desired. The numbers 55 may be omitted from device 10 as shown in FIG. 1 where the lens 27 has no speed indicating numbers. The lamps 32 in the green row of device 10 can be arranged as will be described so that all the lamps in this row light when the vehicle is moving or being accelerated. There will then be no external indication of actual vehicle speed appearing on device 10.

At the top of housing 12 is an extension 60 in which is a compartment C4. A large lamp 64 in this compartment is located behind a red transparent glass or plastic lens 65 on which is the legend "STOP." This lamp provides a conspicuous flashing red signal when the driver encounters a dangerous operating condition as explained in greater detail in connection with FIG. 7. A similar extension 60a is provided at the top of housing 50 of the monitoring device 50. Lamp 64a in this device behind lens 65a is connected in parallel with lamp 64 and lights when lamp 64 lights.

Figure 6:
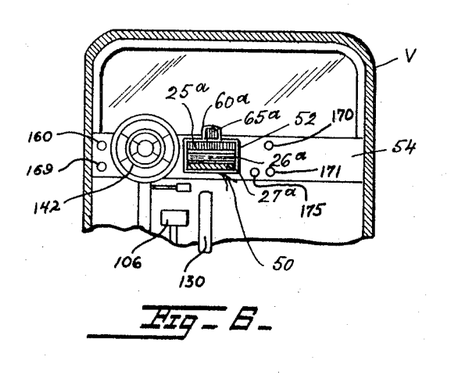
FIG. 6 is a reduced elevational view of the device of FIGS. 4, 5 shown installed at the dashboard of a vehicle.

Furthermore, the front directional lights DF1, DF2 and rear directional lights DR1, DR2 shown in FIGS. 1 and 6 are connected in circuit with the lamps 64, 64a and the red rows of lamps 30, 30' so that all these lights flash when the controls operating the danger signals are actuated. Wires 36a are connected to cable 37a, in the control system of the apparatus.

Figure 7:
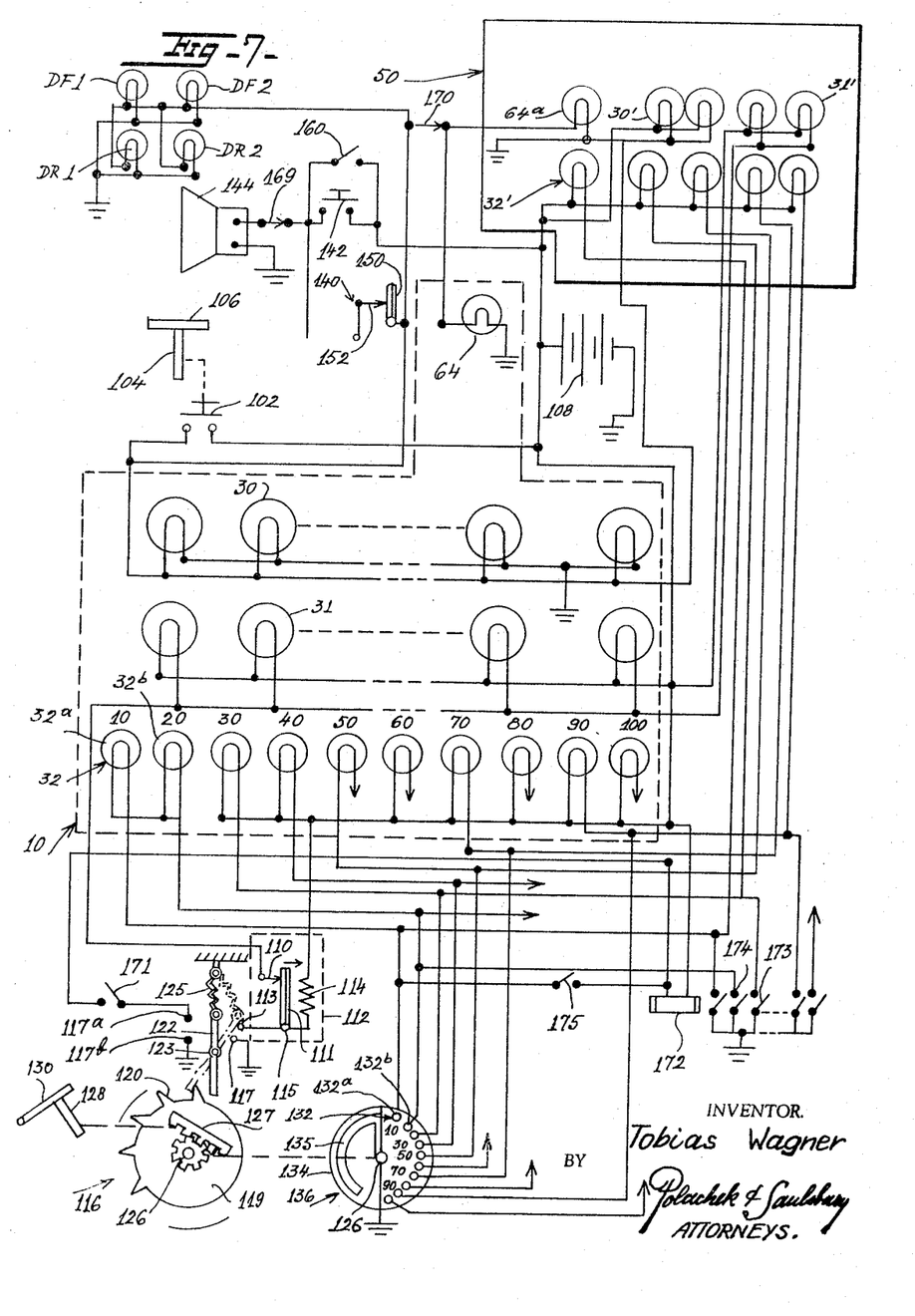
FIG. 7 is a schematic diagram of the signaling system embodied in the apparatus of FIGS. 1–6.

The operation of the system, its electrical and mechanical features, connections and other details will be explained in connection with FIG. 7 to which reference is now made. System 100 includes the main signaling device 10 and auxiliary monitoring device 50. In the main device are three rows of lamps 30, 31 and 32. The lamps 30 are all connected together in parallel. In series with the lamps is a pushbutton switch 102 operatively connected to lever 104 of brake pedal 106 of the vehicle. The battery 108 or other power supply in the vehicle is connected in series with the lamps and switch, so that the red lamps 30 all light when the brake pedal is depressed.

Lamps 31 are connected together in parallel. All of these lamps are connected in series with normally closed fixed and movable contacts 110, 111 of a thermal time delay switch 112, and with battery 108. A heater element 114 for heating contact 111 is connected with terminal 115 of contact 111 to a fixed contact 113 of a step switch 116. The other contact 117 of switch 116 is grounded. Contacts 113, 117 are in series with contacts 110, 111. Contact 111 is a bimetallic element which when sufficiently heated bends away from contact 110 to open switch 112.

The step switch 116 has a rotary wheel 119 formed with teeth 120 arranged to tilt switch lever 122 on pivot pin 123. The wheel 119 can rotate in one direction or the opposite direction. When the wheel rotates clockwise as viewed in FIG. 7, lever 122 pivots counterclockwise on pin 123 away from contacts 113, 117 to close contacts 117a, 117b. When the wheel 119 rotates counterclockwise, lever 112 pivots clockwise to bridge and close contacts 113, 117. A coil spring 125 is attached to the upper end of lever 122 and holds it vertical with the upper end of the lever spaced from contacts 113, 117, 117a, 117b and with the lower end of the lever spaced from teeth 120. The wheel 119 rotates on a shaft 126. This shaft has a gear 126 engaged by rack gear 127 operatively connected to lever 128 of accelerator pedal 130 or to a throttle lever. When the pedal 130 is depressed the wheel 119 rotates clockwise and when pedal 130 is released or raised, the wheel 119 rotates counterclockwise.

When the pedal 130 is released or raised from any depressed position to decelerate the vehicle the contacts 113, 117 close momentarily when they are bridged by lever 122 to light all the amber lamps 31. If the accelerator pedal is raised and then held at any one position so that one tooth of the wheel holds the lever 122 across contacts 113, 117, deceleration drops to zero. After a predetermined time of about one or two seconds, the lighted lamps 31 will go out because the time delay switch 112 will become sufficiently heated and will open contacts 110, 111.

Lamps 32 are connected respectively to contacts 132 of a fixed insulated disk 134. This disk is part of a switch 136 having a rotary arcuate contact arm 135 secured to shaft 126 and rotated thereby when the accelerator pedal 130 is depressed or raised. The position of each of contacts 132 is calibrated to a particular speed of the vehicle which corresponds to a particular position of pedal 130. Ten contacts 132 are shown for the ten lamps 32. It will be noted that the left lamp 32a is connected only to contact 132a. Lamp 32b is connected to contact 132b, etc. At each position of accelerator pedal 130, the lamps of device 10 will be lit up in a long green stripe from the left end of lens 27 up to the lamp designating the speed at which the vehicle is traveling since contact arm 135 will bridge two or more contacts 132. If deceleration should occur at this speed, the amber lamps 31 will light and the right green lamps 32 will go out in turn as arm 135 rotates counterclockwise until the speed of the vehicle is again stabilized at a lower speed, when the amber lamps will go out.

The normally open contacts 117a, 117b of switch 116 are connected via a manually operable switch to a relay 172. This relay has fixed contacts 173 connected respectively to the lamps 32. The movable contacts 174 are all connected together to ground. A further switch 175 is connected between contact 132a and the coil of the relay.

If the operator of the vehicle wishes the green row of lamps to flash and light all together whenever the vehicle is accelerated, he will close switch 171. Then when the pedal 130 is depressed to accelerate the vehicle, wheel 119 will be rotated clockwise and contacts 117a, 117b will be momentarily closed by lever 122 as speed changes rapidly.

The relay 172 will be energized and all contacts 173, 174 will close to light all the green lamps 32 simultaneously. The green light will flash as the vehicle passes each calibrated speed during acceleration. The operator may desire that all the green lights be lighted while the vehicle is in motion and at all speeds. He will then close switch 175. The relay 172 will now be energized and contacts 173, 174 will be closed at all speeds so that the green lights will all be on continuously while the vehicle is in motion. The green lamps 32' in device 50 are connected in parallel with lamps 32 so they duplicate at the operator's driving position, the lighting of green lamps 32. Lamps 30 are connected in parallel with lamps 30'. Lamps 31 are connected in parallel with lamps 31' and lamps 32 are connected in parallel with lamps 32'. Only two of ten lamps 30', 31' and five of ten lamps 32' are shown. The lighting of lamps at the monitor device 50 duplicates the lighting of corresponding lamps at the main signaling device 10.

The red lamp 64 is connected in series with a thermal flasher switch 140 and switch 142. Switch 142 is also connected to horn 144 of the vehicle via switch 169. When the switch 142 is closed, the horn 144 sounds and lamp 64 lights. The light flashes because the bimetallic thermal contact 150 repeatedly separates from the fixed contact 152, as the bimetallic contact heats, and then as the contact 150 cools, it closes with contact 152. This may occur several times a second.

The red lamp 64a of the monitor device 50 is connected in parallel with lamp 64 so both lamps light simultaneously.

A switch 160 is connected in parallel with the horn switch 142 so that the driver of the vehicle can, by closing this switch, keep the horn sounding continuously and the red lamps 64 and 64a flashing continuously until the switch 160 is open.

The front directional signal lamps DF1, DF2 of the vehicle and the rear directional signal lamps DR1, DR2 have filaments connected to terminal 150 of the flasher 140. The red lamps 30 and 30' are also connected to terminal 150. Thus when the horn switch 142 or manually operated switch 160 is closed, the directional lamps and red rows of lamps will flash along with the sounding of the horn and flashing of the large danger signal lamps 64, 64a. If the operator desires to stop the sounding of the horn, he will open switch 169 and the flashing of the danger signal lights will continue without the sounding of the horn. If switch 170 which is in series with lamps 64 and 64a is opened, the large signal lamps will not light but the other directional signal lamps and the red rows of lamps will flash the danger signal, with the horn sounding if switch 169 is closed and with the horn silenced if switch 169 is open.

All the control switches 160, 169, 170, 171, 175 may be located on the monitor device 50 or on the dashboard 54 of the vehicle V as indicated in FIG. 6.

The arrangement of lamps described makes it possible to indicate a dangerous operating condition by momentary or continuous sounding of the horn accompanied by momentary or continuous flashing of a bright red light. Any pressure applied to the brake pedal 106 will produce a bright stripe or red light at the window 25 to signal stopping of the vehicle. The decelaration of the vehicle is indicated by lighting of the amber light. Each time the speed of the vehicle is reduced the amber lamps light up, and they go out when speed stabilizes. If the driver slows down by depressing the brake pedal 106 and simultaneously releasing the accelerator pedal 130, the amber lamps 31, 31' will flash sequentially until the pedal 130 is fully released; meanwhile, the red lamps 30 will be lighted continuously. The green lamps 32, 32' will go out sequentially from right to left, as speed decreases. The lighting of the amber lamps 31, 31', red lamps 30, 30' and danger lamps 64, 64' occur when one or more green lamps 32, 32' are lighted so that a driver of another vehicle behind the vehicle in which the system is installed can see at what speed the stopping, deceleration or dangerous condition signaled to him is occurring.

Figure 8:
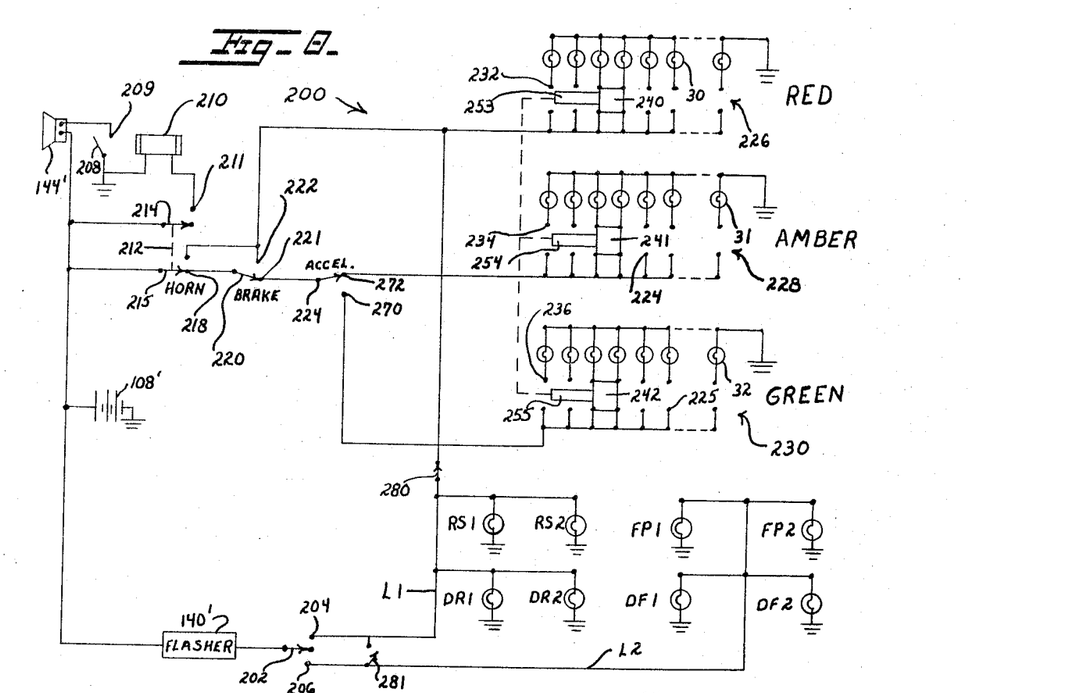
FIG. 8 is a schematic diagram of another signaling system which may be embodied in the apparatus.

Control system 200 shown in FIG. 8 is similar to control system 100 and corresponding parts are identically numbered. Battery 108' of the vehicle is connected to flasher switch 140' which in turn is connected to double throw switch 202 having terminals 204, 206. The battery is also connected to horn 144' which is in circuit with contacts 208, 209 of horn relay 210. The relay is connected to terminal 211 of a double pole-double throw horn operating switch 212.

Switch 212 has poles 214, 215 and terminals 216, 217, 218 in addition to terminal 211. Terminal 218 is connected to brake operated switch 220. This switch has a terminal 221 connected to accelerator operated switch 224 and a terminal 222 connected to fixed contacts 223, 224 and 225 of moving bar switches 226, 228 and 230. The red row of lamps 30 are connected between ground and individual contacts 232 of switch 226. The amber row of lamps 31 are connected between ground and individual contacts 234 of switch 228. The green row of lamps 32 are connected to ground and to individual contacts 236 of switch 230. The switches have movable bars 240, 241, 242 for closing the spaced fixed contacts of the respective switches.

Figure 9:
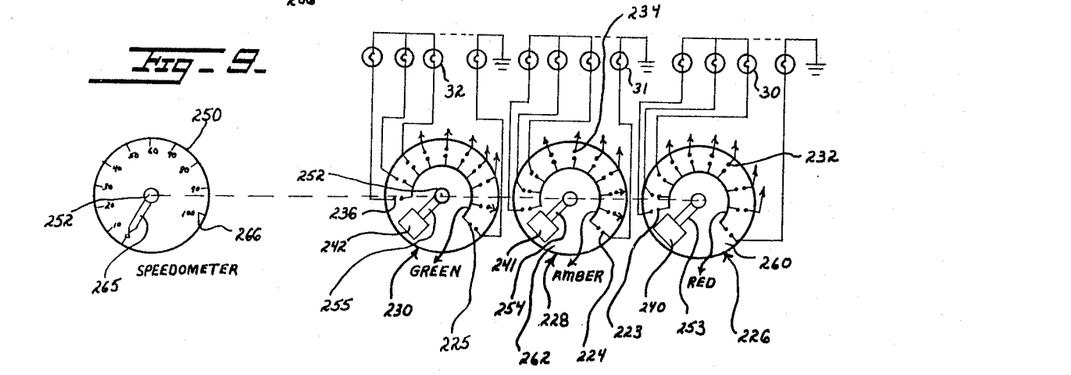
FIG. 9 is a diagram of a speedometer adapted for cooperation with the signaling system of the apparatus.

In order to operate the switch bars, the switches 226, 228 and 230 can be associated with the speedometer 250 of the vehicle as shown schematically in FIG. 9. The speedometer has a shaft 252 on which are mounted switch arms 253, 254, 255 carrying the switch bars 240, 241, 242. The fixed contacts 223, 232 of switch 226 are mounted on a stationary disk 260. Fixed contacts 224, 234 are mounted on stationary disk 262 of switch 228. Fixed contacts 225, 236 are mounted on stationary disk 264 of switch 230. The lamps 30, 31, 32 are connected to the switch contacts in the same manner as indicated in FIG. 8. As the speedometer needle 265 moves along scale 266 when turned by shaft 252, all the switch bars 240, 241, 242 move together over their respective switch contacts to cause one pair of two adjacent pairs of lamps to light simultaneously. In the position shown in FIG. 8, the bars 240, 241, 242 are located so that they light the lamps at the calibrated "30" and "40" mile per hour positions indicating that the speed is thirty-five miles per hour.

The two rear stop lights RS1, RS2, rear directional lights DR1, DR2, front parking lights FP1, FP2 and front directional lights DF1, DF2 are connected in the circuit. Switch 280 is provided in line L1. Switch 281 is connected across lines L1, L2. The rear lights are connected to line L1. The front lights are connected to line L2.

When the driver steps on the accelerator of the vehicle to accelerate the vehicle, switch 224 closes at terminal 270 and the green lamps 32 light wherever the switch bar 242 is located. As the speed is increased the bar 242 moves along the switch contacts 225, 236 so that successive green lights go on and other green lights go out.

When the driver releases pressure on the accelerator to decelerate, switch 224 closes at terminal 272 and the amber lights go on where the switch bar 228 is located. All the green lights go out.

When the driver steps on the brake, the switch contacts 220 close and switch contacts 220, 221 open. The amber and green lights go out and the red lights 30 go on where the switch bar 240 is located. As speed decreases with continued brake application, the red lamps 30 light progressively from right to left in turn as viewed in FIG. 8, while the lamps on the right go out.

When the horn switch 212 is operated, pole 214 closes with terminal 211 to sound the horn and pole 215 closes with terminal 217 to light the red lamp or lamps 30 where the switch bar 30 is located, even though the brake may not then be operated.

In the event a dangerous driving condition arises, the driver will close switch 202 at terminal 204 and will close switch 281. The rear stop lights RS1, RS2, rear directional lights DR1, DR2, front parking lights FP1, FP2, front directional lights DF1, DF2, and the red light or lights 30 where bar 240 is located will all flash continuously.

If switch 280 is opened, the red lights 30 will go out but the rear stop lights and directional lights, and front parking and directional lights will all continue flashing. This arrangement may be desirable when the vehicle is parked on the road for some emergency. If switches 280 and 281 are opened and switch 202 is set to terminal 206, only the front directional and parking lights will flash. If switch 202 is set to terminal 204 and switch 281 is open the front directional and parking lights will be off and only the rear stop lights and directional lights will flash. The operator thus has complete control of the danger signal lighting for any particular purpose.

The system 200 as shown involves only the main signaling device 10a of the vehicle. Lamps 30', 31', 32' of the monitoring device 50 may be connected in parallel with lamps 30, 31, 32, respectively, to provide duplicating lights at the driver's position.

The driver of the signaling vehicle, by watching his monitor signaling device 50 is continuously informed of the operative condition of the main signaling device and of the particular lighted condition of the main signaling lamps. The presence of the monitor device at the driver's position helps to keep the drive alert, with his attention fixed on the road and driving conditions which he is signaling to other drivers.

Although the system has been illustrated with ten lamps in each of the rows of devices 10, 50, more or less than ten lamps may be used. Instead of using colored lenses in front of the lamps, the lenses can be clear or translucent white, and the lamps themselves can be colored red, amber or green.

The main signaling device can be mounted on top of the vehicle V or wherever it will be most conspicuous and easily seen by drivers behind the vehicle in which the system is installed. The system makes it possible for drivers and vehicle operators to signal to adjacent drivers in a more meaningful and effective manner than heretofore, and greatly contributes to driving and traffic safety.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. A safety signaling system for a vehicle having a body, an operator's position in said body, a braking system operable by the operator, throttle means operable by the operator for controlling speed, and a horn operated by a horn switch; said system comprising a main signaling device mountable on said body and visible from the exterior thereof, an auxiliary monitoring signaling device mounted inside the vehicle at the operator's position; each of the devices comprising a closed housing having an open front, partitions in the housing dividing the interior thereof into three compartments, first, second and third rows of lamps in the three compartments respectively, the lamps in the first row emitting red light, the lamps in the second row emitting amber light, the lamps in the third row emitting green light; first control means for operatively connecting the lamps in the first row to braking system for lighting the first row of lamps to emit red light when the braking system is actuated; second control means for operatively connecting the lamps in the second row to throttle means for lighting the second row of lamps to emit amber light only when the throttle means is actuated to decelerate the vehicle; and third control means for operatively connecting the lamps in the third row to the throttle means for lighting the third row of lamps to emit green light only when the vehicle is in motion, the lamps in the first, second and third rows of the housing in the main signaling device being connected in parallel with the lamps in the first, second and third rows in the housing of the monitoring signaling device, each housing having another compartment with another lamp emitting a red light, said other lamp and the red lamps in the first row being connected in circuit with said horn switch so that the other lamp and red lamps in each housing light when the horn switch is closed to sound the horn upon occurrence of a dangerous driving condition, and a flasher switch in circuit with the other lamps and red lamps in both devices for interrupting the lighting of the red lamps and other lamps repeatedly while the horn switch is closed.

2. A safety signaling system for a vehcile having a body, an operator's position in said body, a braking system operable by the operator, throttle means operable by the operator for controlling speed, and a horn operated by a horn switch; said system comprising a main signalling device mountable on said body and visible from the exterior thereof, an auxiliary monitoring signaling device mounted inside the vehicle at the operator's position; each of the devices comprising a closed housing having an open front, partitions in the housing dividing the interior thereof into three compartments, first, second and third rows of lamps in the three compartments respectively, the lamps in the first row emitting red light, the lamps in the second row emitting amber light, the lamps in the third row emitting green light; first control means for operatively connecting the lamps in the first row to braking system for lighting the first row of lamps to emit red light when the braking system is actuated; second control means for operatively connecting the lamps in the second row to the throttle means for lighting the second row of lamps to emit amber light only when the throttle means is actuated to decelerate the vehicle; and third control means for operatively connecting the lamps in the third row to the throttle means for lighting the third row of lamps to emit green light only when the vehicle is in motion, the lamps in the first, second and third rows of the housing in the main signaling device being connected in parallel with the lamps in the first, second and third rows in the housing of the monitoring signaling device; the first control means including a first switch operatively connected to and actuated by said braking system; the second control means including a step switch having a toothed wheel operatively connected to and rotated by said throttle means, said step switch having a lever actuated by teeth of the toothed wheel, and switch contacts in circuit with the lamps in the second row in each device, said switch contacts being closed only when the wheel rotates in one direction as the throttle means is actuated to decelerate the vehicle so that the lamps in the second row light momentarily as each tooth of the wheel contacts and tilts the lever of the step switch, said step switch having other contacts closed by said lever when the wheel rotates in an opposite direction to accelerate the vehicle, said green lamps being connected in circuit with the said other contacts so that all the green lamps light when the throttle means is actuated to accelerate the vehicle.

3. A safety signaling system for a vehicle having a body, an operator's position in said body, a braking system operable by the operator, throttle means operable by the operator for controlling speed, and a horn operated by a horn switch; said system comprising a main signaling device mountable on said body and visible from the exterior thereof, an auxiliary monitoring signaling device mounted inside the vehicle at the operator's position; each of the devices comprising a closed housing having an open front, partitions in the housing dividing the interior thereof into three compartments, first, second and third rows of lamps in the three compartments respectively, the lamps in the first row emitting red light, the lamps in the second row emitting amber light, the lamps in the third row emitting green light; first control means for operatively connecting the lamps in the first row to braking system for lighting the first row of lamps to emit red light when the braking system is actuated; second control means for operatively connecting the lamps in the second row to the throttle means for lighting the second row of lamps to emit amber light only when the throttle means is actuated to decelerate the vehicle; and third control means for operatively connecting the lamps in the third row to the throttle means for lighting the third row of lamps to emit green light only when the vehicle is in motion, the lamps in the first, second and third rows of the housing in the main signaling device being connected in parallel with the lamps in the first, second and third rows in the housing of the monitoring signaling device; the first control means including a first switch operatively connected to and actuated by said braking system; the second control means including a step switch having a toothed wheel operatively connected to and rotated by said throttle means, said step switch having a lever actuated by teeth of the wheel, and switch contacts in circuit with the lamps in the second row in each device, said switch contacts being closed only when the wheel rotates in one direction as the throttle means is actuated to decelerate the vehicle so that the lamps in the second row light momentarily as each tooth of the wheel contacts and tilts the lever of the step switch, a time delay switch in circuit with the step switch so that the lighted lamps in the second row go out after a predetermined time when one of the teeth remains in contact with the lever of the step switch, said step switch having other contacts closed by said lever when the wheel rotates in an opposite direction to accelerate the vehicle, said green lamps being connected in circuit with the said other contacts so that all the green lamps light when the throttle means is actuated to accelerate the vehicle.

4. A safety signaling system for a vehicle having a body, an operator's position in said body, a braking system operable by the operator, throttle means operable by the operator for controlling speed, and a horn operated by a horn switch; said system comprising a main signaling device mountable on said body and visible from the exterior thereof, an auxiliary monitoring signaling device mounted inside the vehicle at the operator's position; each of the devices comprising a closed housing having an open front, partitions in the housing dividing the interior thereof into three compartments, first, second and third rows of lamps in the three compartments respectively, the lamps in the first row emitting red light, the lamps in the second row emitting amber light, the lamps in the third row emitting green light; first control means for operatively connecting the lamps in the first row to braking system for lighting the first row of lamps to emit red light when the braking system is actuated; second control means for operatively connecting the lamps in the second row to the throttle means for lighting the second row of lamps to emit amber light only when the throttle means is actuated to decelerate the vehicle; and third control means for operatively connecting the lamps in the third row to the throttle means for lighting the third row of lamps to emit green light only when the vehicle is in motion, the lamps in the first, second and third rows of the housing in the main signaling device being connected in parallel with the lamps in the first, second and third rows in the housing of the monitoring signaling device; the first control means including a first switch operatively connected to and actuated by said braking system; the second control means including a step switch having a toothed wheel operatively connected to and rotated by said throttle means, said step switch having a lever actuated by teeth of the wheel, and switch contacts in circuit with the lamps in the second row in each device, said switch contacts being closed only when the ratchet wheel rotates in one direction as the throttle means is actuated to decelerate the vehicle so that the lamps in the second row light momentarily as each tooth of the wheel contacts and tilts the lever of the step switch, a time delay switch in circuit with the step switch so that the lighted lamps in the second row go out after a predetermined time when one of the teeth remains in contact with the lever of the step switch; the third control means including a switch having a plurality of stationary contacts, a bridging arm movable over the stationary contacts in turn, said arm being operatively connected to and operated by said throttle means, the third row of lamps being connected to the respective stationary contacts so that different number of lamps in the third row thereof light at each of setting of said throttle means at each different speed of the vehicle.

5. A safety signaling system for a vehicle having a body, an operator's position in said body, a braking system operable by the operator, throttle means operable by the operator for controlling speed, and a horn operated by a horn switch; said system comprising a main signaling device mountable on said body and visible from the exterior thereof, an auxiliary monitoring signaling device mounted inside the vehicle at the operator's position; each of the devices comprising a closed housing having an open front, partitions in the housing dividing the interior thereof into three compartments, first, second and third rows of lamps in the three compartments respectively, the lamps in the first row emitting red light, the lamps in the second row emitting amber light, the lamps in the third row emitting green light; first control means for operatively connecting the lamps in the first row to braking system for lighting the first row of lamps to emit red light when the braking system is actuated; second control means for operatively connecting the lamps in the second row to the throttle means for lighting the second row of lamps to emit amber light only when the throttle means is actuated to decelerate the vehicle; and third control means for operatively connecting the lamps in the third row to the throttle means for lighting the third row of lamps to emit green light only when the vehicle is in motion, the lamps in the first, second and third rows of the housing in the main signaling device being connected in parallel with the lamps in the first, second and third rows in the housing of the monitoring signaling device; the first control means including a first switch operatively connected to and actuated by said braking system; the second control means including a step switch having a toothed wheel operatively connected to and rotated by said throttle means, said step switch having a lever actuated by teeth of the wheel, and switch contacts in circuit with the lamps in the second row in each device, said switch contacts being closed only when the wheel rotates in one direction as the throttle means is actuated to decelerate the vehicle so that the lamps in the second row light momentarily as each tooth of the wheel contacts and tilts the lever of the step switch, a time delay switch in circuit with the step switch so that the lighted lamps in the second row go out after a predetermined time when one of the teeth remains in contact with the lever of the step switch; the third control means including a switch having a plurality of stationary contacts, a bridging arm movable over the stationary contacts in turn, said arm being operatively connected to and operated by said throttle means, the third row of lamps being connected to the respective stationary contacts so that different number of lamps in the third row thereof light at each of setting of said throttle means at each different speed of the vehicle; each housing having another compartment with another lamp emitting a red danger light, said other lamp and the red lamps being connected in circuit with the horn switch so that the other lamp and red lamps in each housing light when the horn switch is closed to sound the horn upon occurrence of a dangerous driving condition, and a flasher switch in circuit with the red lamps and other lamps in both devices for interrupting the lighting of the red lamps and other lamps repeatedly while the horn switch is closed.

6. A safety signaling system for a vehicle having a body, an operator's position in said body, a braking system operable by the operator, throttle means operable by the operator for controlling speed, and a horn operated by a horn switch; said system comprising a main signaling device mountable on said body and visible from the exterior thereof, an auxiliary monitoring signaling device mounted inside the vehicle at the operator's position; each of the devices comprising a closed housing having an open front, partitions in the housing dividing the interior thereof into three compartments, first, second and third rows of lamps in the three compartments, respectively, the lamps in the first row emitting red light, the lamps in the second row emitting amber light, the lamps in the third row emitting green light; first control means for operatively connecting the lamps in the first row to braking system for lighting the first row of lamps to emit red light when the braking system is actuated; second control means for operatively connecting the lamps in the second row to the throttle means for lighting the second row of lamps to emit amber light only when the throttle means is actuated to decelerate the vehicle; and third control means for operatively connecting the lamps in the third row to the throttle means for lighting the third row of lamps to emit green light only when the vehicle is in motion, the lamps in the first, second and third rows of the housing in the main signaling device being connected in parallel with the lamps in the first, second and third rows in the housing of the monitoring signaling device; the first control means including a first switch operatively connected to and actuated by said braking system; the second control means including a step switch having a toothed wheel operatively connected to and rotated by said throttle means, said step switch having a lever actuated by teeth of the ratchet wheel, and switch contacts in circuit with the lamps in the second row in each device, said switch contacts being closed only when the wheel rotates in one direction as the throttle means is actuated to decelerate the vehicle so that the lamps in the second row light momentarily as each tooth of the wheel contacts and tilts the lever of the step switch, a time delay switch in circuit with the step switch so that the lighted lamps in the second row go out after a predetermined time when one of the teeth remains in contact with the lever of the step switch; the third control means including a switch having a plurality of stationary contacts, a bridging arm movable over the stationary contacts in turn, said arm being operatively connected to and operated by said throttle means, the third row of lamps being connected to the respective stationary contacts so that different number of lamps in the third row thereof light at each of setting of said throttle means at each different speed of the vehicle; each housing having another compartment with another lamp emitting a red danger light, said other lamp and the red lamps being connected in circuit with the horn switch so that the other lamp and red lamps in each housing light when the horn switch is closed to sound the horn upon occurrence of a dangerous driving condition, and a flasher switch in circuit with the red lamps and other lamps in both devices for interrupting the lighting of the red lamps and other lamps repeatedly while the horn switch is closed; and a further manually operable switch connected in parallel with the horn switch and in series with the other lamps, so that the horn sounds and the other lamps light and repeatedly flash while the further switch is closed.

7. A safety signaling system for a vehicle having a body, an operator's position in said body, a braking system operable by the operator, throttle means operable by the operator for controlling speed, and a horn operated by a horn switch; said system comprising a main signaling device mountable on said body and visible from the exterior thereof, an auxiliary monitoring signaling device mounted inside the vehicle at the operator's position; each of the devices comprising a closed housing having an open front, partitions in the housing dividing the interior thereof into three compartments, first, second and third rows of lamps in the three compartments respectively, the lamps in the first row emitting red light, the lamps in the second row emitting ammber light, the lamps in the third row emitting green light; first control means for operatively connecting the lamps in the first row to braking system for lighting the first row of lamps to emit red light when the braking system is actuated; second control means for operatively connecting the lamps in the second row to the throttle means for lighting the second row of lamps to emit amber light only when the throttle means is actuated to decelerate the vehicle; and third control means for operatively connecting the lamps in the third row to the throttle means for lighting the third row of lamps to emit green light only when the vehicle is in motion, the lamps in the first, second and third rows of the housing in the main signaling device being connected in parallel with the lamps in the first, second and third rows in the housing of the monitoring signaling device, each housing having another compartment with another lamp emitting a red light, said other lamp and the red lamps being connected in circuit with said horn switch so that the other lamp and red lamps in each housing light when the horn switch is closed to sound the horn upon occurrence of a dangerous driving condition; a flasher switch in circuit with the other lamps in both devices for interrupting the lighting of the other lamps repeatedly while the horn switch is closed, a transparent colored lens closing the open front of each compartment, each lens having a different color, to emit the red, amber and green lights; and a danger signal switch in circuit with said flasher switch for actuating the same to light the red lamps and other lamps independently of the horn switch.

8. A safety signaling system for a vehicle having a body, an operator's position in said body, a braking system operable by the operator, throttle means operable by the operator for controlling speed, and a horn operated by a horn switch; said system comprising a main signaling device mountable on said body and visible from the exterior thereof, an auxiliary monitoring signaling device mounted inside the vehicle at the operator's position; each of the devices comprising a closed housing having an open front, partitions in the housing dividing the interior thereof into three compartments, first, second and third rows of lamps in the three compartments respectively, the lamps in the first row emitting red light, the lamps in the second row emitting amber light, the lamps in the third row emitting green light; first control means for operatively connecting the lamps in the first row to braking system for lighting the first row of lamps to emit red light when the braking system is actuated; second control means for operatively connecting the lamps in the second row to the throttle means for lighting the second row of lamps to emit amber light only when the throttle means is actuated to decelerate the vehicle; and third control means for operatively connecting the lamps in the third row to the throttle means for lighting the third row of lamps to emit green light only when the vehicle is in motion, the lamps in the first, second and third rows of the housing in the main signaling device being connected in parallel with the lamps in the first, second and third rows in the housing of the monitoring signaling device, each housing having another compartment with another lamp emitting a red light, said other lamp being connected in circuit with said horn switch so that the other lamp in each housing lights when the horn switch is closed to sound the horn upon occurrence of a dangerous driving condition; a flasher switch in circuit with the other lamps in both devices for interrupting the lighting of the other lamps repeatedly while the horn switch is closed; and a transparent colored lens closing the open front of each compartment, each lens having a different color, to emit the red, amber and green lights, the main signaling device having a width substantially equal to the width of the vehicle so that the main signaling device is conspicuously visible when mounted at the rear of the body of the vehicle.

9. A safety signaling system for a vehicle having a body, an operator's position in said body, a braking system operable by the operator, throttle means operable by the operator for controlling speed, and a horn operated by a horn switch; said system comprising a main signaling device mountable on said body and visible from the exterior thereof, an auxiliary monitoring signaling device mounted inside the vehicle at the operator's position; each of the devices comprising a closed housing having an open front, partitions in the housing dividing the interior thereof into three compartments, first, second and third rows of lamps in the three compartments respectively, the lamps in the first row emitting red light, the lamps in the second row emitting amber light, the lamps in the third row emitting green light; first control means for operatively connecting the lamps in the first row to braking system for lighting the first row of lamps to emit red light when the braking system is actuated; second control means for operatively connecting the lamps in the second row to the throttle means for lighting the second row of lamps to emit amber light only when the throttle means is actuated to decelerate the vehicle; third control means for operatively connecting the lamps in the third row to the throttle means for lighting the third row of lamps to emit green light only when the vehicle is in motion, the lamps in the first, second and third rows of the housing in the main signaling device being connected in parallel with the lamps in the first, second and third rows in the housing of the monitoring signaling device, each housing having another compartment with another lamp emitting a red light, said other lamp, and the red lamps being connected in circuit with said horn switch so that the other lamp and red lamps in each housing light when the horn switch is closed to sound the horn upon occurrence of a dangerous driving condition; and a flasher switch in circuit with the other lamps in both devices for interrupting the lighting of the other lamps repeatedly while the horn switch is closed, a transparent clear lens closing the open front of each compartment, the lamps in the several compartments being colored to emit the red, amber and green lights respectively.

10. A safety signaling system for a vehicle having a body, an operator's position in said body, a braking system operable by the operator, throttle means operable by the operator for controlling speed, and a horn operated by a horn switch; said system comprising a main signaling device mountable on said body and visible from the exterior thereof, an auxiliary monitoring signaling device mounted inside the vehicle at the operator's position; each of the devices comprising a closed housing having an open front, partitions in the housing dividing the interior thereof into three compartments, first, second and third rows of lamps in the three compartments respectively, the lamps in the first row emitting red light, the lamps in the second row emitting amber light, the lamps in the third row emitting green light; first control means for operatively connecting the lamps in the first row to braking system for lighting the first row of lamps to emit red light when the braking system is actuated; second control means for operatively connecting the lamps in the second row to the throttle means for lighting the second row of lamps to emit amber light only when the throttle means is actuated to decelerate the vehicle; and third control means for operatively connecting the lamps in the third row to the throttle means for lighting the third row of lamps to emit green light only when the vehicle is in motion, the lamps in the first, second and third rows of the housing in the main signaling device being connected in parallel with the lamps in the first, second and third rows in the housing of the monitoring signaling device, each housing having another compartment with another lamp emitting a red light, said other lamp being connected in circuit with said horn switch so that the other lamp in each housing lights when the horn switch is closed to sound the horn upon occurrence of a dangerous driving condition, and a flasher switch in circuit with the other lamps in both devices for interrupting the lighting of the other lamps repeatedly while the horn switch is closed, and a further manually operable switch connected in parallel with the horn switch and in series with the other lamps, so that the horn sounds and the other lamps light and repeatedly flash while the further switch is closed.

11. A safety signaling system for a vehicle having a body, an operator's position in said body, a braking system operable by the operator, throttle means operable by the operator for controlling speed, a speedometer at the operator's position, and a horn operated by a horn switch; said system comprising a main signaling device mountable on said body and visible from the exterior thereof, an auxiliary monitoring signaling device mounted inside the vehicle at the operator's position; each of the devices comprising a closed housing having an open front, partitions in the housing dividing the interior thereof into three compartments, first, second and third rows of lamps in the three compartments respectively, the lamps in the first row emitting red light, the lamps in the second row emitting amber light, the lamps in the third row emitting green light; first control means for operatively connecting the lamps in the first row to the braking system for lighting the first row of lamps to emit red light when the braking system is actuated; second control means for operatively connecting the lamps in the second row to the throttle means for lighting the second row of lamps to emit amber light only when the throttle means is actuated to decelerate the vehicle; third control means for operatively connecting the lamps in the third row to the speedometer for lighting the third row of lamps to emit green light only when the vehicle is in motion, the lamps in the first, second and third rows of the housing in the main signaling device being connected in parallel with the lamps in the first, second and third rows in the housing of the monitoring signaling device; and a flasher switch in circuit with the red lamps in both devices for interrupting the lighting of the red lamps repeatedly while the horn switch is closed.

12. A safety signaling system for a vehicle having a body, an operator's position in said body, a braking system operable by the operator, throttle means operable by the operator for controlling speed, a speedometer at the operator's position, and a horn operated by a horn switch; said system comprising a main signaling device mountable on said body and visible from the exterior thereof, an auxiliary monitoring signaling device mounted inside the vehicle at the operator's position; each of the devices comprising a closed housing having an open front, partitions in the housing dividing the interior thereof into three compartments, first, second and third rows of lamps in the three compartments respectively, the lamps in the first row emitting red light, the lamps in the second row emitting amber light, the lamps in the third row emitting green light; first control means for operatively connecting the lamps in the first row to the braking system for lighting the first row of lamps to emit red light when the braking system is actuated; second control means for operatively connecting the lamps in the second row to the throttle means for lighting the second row of lamps to emit amber light only when the throttle means is actuated to decelerate the vehicle; third control means for operatively connecting the lamps in the third row to the speedometer for lighting the third row of lamps to emit green light only when the vehicle is in motion, the lamps in the first, second and third rows of the housing in the main signaling device being connected in parallel with the lamps in the first, second and third rows in the housing of the monitoring signaling device; and a flasher switch in circuit with the red lamps in both devices for interrupting the lighting of the red lamps repeatedly while the horn switch is closed, said vehicle having front and rear directional lamps, means connecting the directional lamps in circuit with the flasher switch, and a danger signal switch in circuit with the flasher switch so that the directional lamps flash while the danger signal switch is closed.

13. A safety signaling system for a vehicle having a body, an operator's position in said body, a braking system operable by the operator, throttle means operable by the operator for controlling speed, and a horn operated by a horn switch; said system comprising a main signaling device mountable on said body and visible from the exterior thereof, an auxiliary monitoring signaling device mounted inside the vehicle at the operator's position; each of the devices comprising a closed housing having an open front, partitions in the housing dividing the interior thereof into three compartments, first, second and third rows of lamps in the three compartments respectively, the lamps in the first row emitting red light, the lamps in the second row emitting amber light, the lamps in the third row emitting green light; first control means for operatively connecting the lamps in the first row to braking system for lighting the first row of lamps to emit red light when the braking system is actuated; second control means for operatively connecting the lamps in the second row to the throttle means for lighting the second row of lamps to emit amber light only when the throttle means is actuated to decelerate the vehicle; and third control means for operatively connecting the lamps in the third row to the throttle means for lighting the third row of lamps to emit green light only when the vehicle is in motion, the lamps in the first, second and third rows of the housing in the main signaling device being connected in parallel with the lamps in the first, second and third rows in the housing of the monitoring signaling device, each housing having another compartment with another emitting a red light, said other lamp and the red lamps in the first row being connected in circuit with said horn switch so that the other lamp and red lamps in each housing light when the horn switch is closed to sound the horn upon occurrence of a dangerous driving condition, and a flasher switch in circuit with the other lamps and red lamps in both devices for interrupting the lighting of the red lamps and other lamps repeatedly while the horn switch is closed, said vehicle having front and rear directional lamps, and means connecting the directional lamps in circuit with the flasher switch so that the directional lamps flash while the red lamps flash.

14. A safety signaling system for a vehicle having a body, an operator's position in said body, a braking system operable by the operator, throttle means operable by the operator for controlling speed, a speedometer at the operator's position, and a horn operated by a horn switch; said system comprising a main signaling device mountable on said body and visible from the exterior thereof, an auxiliary monitoring signaling device mounted inside the vehicle at the operator's position; each of the devices comprising a closed housing having an open front, partitions in the housing dividing the interior thereof into three compartments, first, second and third rows of lamps in the three compartments respectively, the lamps in the first row emitting red light, the lamps in the second row emitting amber light, the lamps in the third row emitting green light; first control means for operatively connecting the lamps in the first row to the braking system for lighting the first row of lamps to emit red light when the braking system is actuated; second control means for operatively connecting the lamps in the second row to the throttle means for lighting the second row of lamps to emit amber light only when the throttle means is actuated to decelerate the vehicle; third control means for operatively connecting the lamps in the third row to the speedometer for lighting the third row of lamps to emit green light only when the vehicle is in motion, the lamps in the first, second and third rows of the housing in the main signaling device being connected in parallel with the lamps in the first, second and third rows in the housing of the monitoring signaling device; and a flasher switch in circuit with the red lamps in both devices for interrupting the lighting of the red lamps repeatedly while the horn switch is closed, said vehicle having front and rear directional lamps, means connecting the directional lamps in circuit with the flasher switch, and a danger signal switch in circuit with the flasher switch so that the directional lamps flash while the danger signal switch is closed, said first, second and third control means including switches sequentially lighting a group of red, amber and green lights at each different speed of the vehicle, each group including at least one red light, one amber light and one green light.

15. A safety signaling system for a vehicle having a body, an operator's position in said body, a braking system operable by the operator, throttle means operable by the operator for controlling speed, a speedometer at the operator's position, and a horn operated by a horn switch; said system comprising a main signaling device mountable on said body and visible from the exterior thereof, an auxiliary monitoring signaling device mounted inside the vehicle at the operator's position; each of the devices comprising a closed housing having an open front, partitions in the housing dividing the interior thereof into three compartments, first, second and third rows of lamps in the three compratments respectively, the lamps in the first row emitting red light, the lamps in the second row emitting amber light, the lamps in the third row emitting green light; first control means for operatively connecting the lamps in the first row to the braking system for lighting the first row of lamps to emit red light when the braking system is actuated; second control means for operatively connecting the lamps in the second row to the throttle means for lighting the second row of lamps to emit amber light only when the throttle means is actuated to decelerate the vehicle; third control means for operatively connecting the lamps in the third row to the speedometer for lighting the third row of lamps to emit green light only when the vehicle is in motion, the lamps in the first, second and third rows of the housing in the main signaling device being connected in parallel with the lamps in the first, second and third rows in the housing of the monitoring signaling device; and a flasher switch in circuit with the red lamps in both devices for interrupting the lighting of the red lamps repeatedly while the horn switch is closed, said vehicle having front and rear directional lamps, front parking lamps and rear stop lamps, and means connecting the directional lamps, parking lamps and rear stop lamps in circuit with the flasher switch so that the directional lamps flash while the danger signal switch is closed.

16. A safety signaling system for a vehicle having a body, an operator's position in said body, a braking system operable by the operator, throttle means operable by the operator for controlling speed, and a horn operated by a horn switch; said system comprising a main signaling device mountable on said body and visible from the exterior thereof, an auxiliary monitoring signaling device mounted inside the vehicle at the operator's position; each of the devices comprising a closed housing having an open front, partitions in the housing dividing the interior thereof into three compartments, first, second and third rows of lamps in the three compartments respectively, the lamps in the first row emitting red light, the lamps in the second row emitting amber light, the lamps in the third row emitting green light; first control means for operatively connecting the lamps in the first row to braking system for lighting the first row of lamps to emit red light when the braking system is actuated; second control means for operatively connecting the lamps in the second row to the throttle means for lighting the second row of lamps to emit amber light only when the throttle means is actuated to decelerate the vehicle; and third control means for operatively connecting the lamps in the third row to the throttle means for lighting the third row of lamps to emit green light only when the vehicle is in motion, the lamps in the first, second and third rows of the housing in the main signaling device being connected in parallel with the lamps in the first, second and third rows in the housing of the monitoring signaling device, each housing having another compartment with another lamp emitting a red light, said other lamp and the red lamps in the first row being connected in circuit with said horn switch so that the other lamp and red lamps in each housing light when the horn switch is closed to sound the horn upon occurrence of a dangerous driving condition, and a flasher switch in circuit with the other lamps and red lamps in both devices for interrupting the lighting of the red lamps and other lamps repeatedly while the horn switch is closed, said vehicle having front and rear directional lamps, and means connecting the directional lamps in circuit with the flasher switch so that the directional lamps flash while the red lamps flash, and a danger signal switch in circuit with the flasher switch for actuating the same independently of the horn switch, so that the directional lamps and red lamps flash when the danger signal switch is closed.

References Cited by the Examiner
UNITED STATES PATENTS

| | | | |
|---|---|---|---|
| 2,526,611 | 10/1950 | Rodrick | 340—66 |
| 2,814,796 | 11/1957 | Kozel | 340—263 |

NEIL C. READ, *Primary Examiner.*

A. WARING, *Assistant Examiner.*